United States Patent
Ruan et al.

(10) Patent No.: US 9,992,776 B2
(45) Date of Patent: Jun. 5, 2018

(54) WIRELESS DEVICE AND RADIO FREQUENCY CHANNEL CALIBRATION METHOD

(71) Applicant: Huawei Technologies Co., Ltd., Shenzhen (CN)

(72) Inventors: Wei Ruan, Shanghai (CN); Qian Li, Suzhou (CN); Mingyue Wang, Suzhou (CN); Hongyi Tan, Suzhou (CN); Xi Zhao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/784,940

(22) Filed: Oct. 16, 2017

(65) Prior Publication Data

US 2018/0110038 A1    Apr. 19, 2018

(30) Foreign Application Priority Data

Oct. 17, 2016  (CN) .......................... 2016 1 0901193

(51) Int. Cl.
| | |
|---|---|
| *H04W 72/04* | (2009.01) |
| *H04B 17/12* | (2015.01) |
| *G01S 11/02* | (2010.01) |

(52) U.S. Cl.
CPC .......... *H04W 72/048* (2013.01); *H04B 17/12* (2015.01); *H04W 72/0453* (2013.01); *G01S 11/02* (2013.01)

(58) Field of Classification Search
CPC ....................... H04W 72/048; H04W 72/0453; H04B 17/12; G01S 11/02
See application file for complete search history.

(56) References Cited

U.S. PATENT DOCUMENTS

| | | | |
|---|---|---|---|
| 2008/0150514 A1* | 6/2008 | Crodeanu et al. ..... | H03D 13/00 324/76.77 |
| 2010/0020857 A1* | 1/2010 | Takano et al. .......... | H04B 1/40 375/219 |

(Continued)

FOREIGN PATENT DOCUMENTS

| | | |
|---|---|---|
| CN | 1320837 C | 6/2007 |
| CN | 101582714 A | 11/2009 |

(Continued)

OTHER PUBLICATIONS

Machine Translation and Abstract of Chinese Publication No. CN1320837, Jun. 6, 2007, 10 pages.

(Continued)

*Primary Examiner* — Marisol Figueroa
(74) *Attorney, Agent, or Firm* — Conley Rose, P.C.

(57) ABSTRACT

A wireless device and a radio frequency channel calibration method, where the wireless device includes a first radio frequency circuit and a second radio frequency circuit that operate on a same frequency band, and a processor. The first radio frequency circuit is configured to send a calibration signal using a calibration antenna. The second radio frequency circuit is configured to receive the calibration signal using each of at least two to-be-calibrated antennas. The second radio frequency circuit corresponds to at least two radio frequency channels, the at least two radio frequency channels respectively correspond to the at least two to-be-calibrated antennas. The processor is configured to determine a device phase difference of each of the at least two radio frequency channels, and calibrate a corresponding radio frequency channel using the device phase difference of each of the at least two radio frequency channels.

17 Claims, 3 Drawing Sheets

(56) References Cited

U.S. PATENT DOCUMENTS

| | | |
|---|---|---|
| 2010/0123624 A1 | 5/2010 | Minear et al. |
| 2014/0242914 A1 | 8/2014 | Monroe |
| 2015/0255868 A1 | 9/2015 | Haddad et al. |

FOREIGN PATENT DOCUMENTS

| | | | |
|---|---|---|---|
| CN | 101604991 A | 12/2009 | |
| EP | 1615361 A1 * | 1/2006 | ............ H04B 17/00 |
| WO | 2009083961 A1 | 7/2009 | |

OTHER PUBLICATIONS

Machine Translation and Abstract of Chinese Publication No. CN101582714, Nov. 18, 2009, 24 pages.
Machine Translation and Abstract of Chinese Publication No. CN101604991, Dec. 16, 2009, 33 pages.
Foreign Communication From a Counterpart Application, European Application No. 17196691.4, Extended European Search Report dated Jan. 18, 2018, 5 pages.

* cited by examiner

WIRELESS DEVICE AND RADIO FREQUENCY CHANNEL CALIBRATION METHOD

CROSS-REFERENCE TO RELATED APPLICATION

This application claims priority to Chinese Patent Application No. 201610901193.7 filed on Oct. 17, 2016, which is hereby incorporated by reference in its entirety.

TECHNICAL FIELD

This application relates to the field of communications technologies, and in particular, to a wireless device and a radio frequency channel calibration method.

BACKGROUND

A multiple-input, multiple-output (MIMO) technology means that both a transmitter and a receiver use multiple antennas. The MIMO technology can improve bandwidth without increasing a spectrum resource and an antenna transmit power.

Due to device aging, a temperature change, or the like, after a signal received by an antenna passes through a radio frequency channel formed by multiple devices, a phase may vary. An angle of arrival (AOA) cannot be accurately measured due to signals with different phases. Therefore, radio frequency channel calibration is required.

At present, radio frequency channel calibration is usually performed using a dedicated hardware calibration instrument such as a signal generator or a spectrum analyzer before device delivery. After the device delivery, radio frequency channel phases may be different due to device aging, a temperature change, or the like.

SUMMARY

This application provides a wireless device and a radio frequency channel calibration method in order to resolve a problem that radio frequency channel phases are different due to device aging, a temperature change, or the like.

According to a first aspect, a wireless device is provided, where the wireless device includes a first radio frequency module, a second radio frequency module, and a processor, and the first radio frequency module and the second radio frequency module operate on a same frequency band, where the first radio frequency module is connected to a calibration antenna, and configured to send a calibration signal using the calibration antenna, the second radio frequency module is connected to at least two to-be-calibrated antennas, and configured to receive the calibration signal using each of the at least two to-be-calibrated antennas, where the second radio frequency module corresponds to at least two radio frequency channels, the at least two radio frequency channels respectively correspond to the at least two to-be-calibrated antennas, and a quantity of the at least two radio frequency channels is the same as a quantity of the at least two to-be-calibrated antennas, and the processor is configured to determine a device phase difference of each of the at least two radio frequency channels, and calibrate a corresponding radio frequency channel using the device phase difference of each of the at least two radio frequency channels, where the device phase difference is a difference between a receive phase difference and a distance phase difference that are of the corresponding radio frequency channel, the receive phase difference of the corresponding radio frequency channel is a phase difference between the calibration signal received on the corresponding radio frequency channel and the calibration signal received on a reference radio frequency channel, the distance phase difference of the corresponding radio frequency channel is based on a distance difference of the corresponding radio frequency channel and a channel phase difference of the calibration signal, and the distance difference of the corresponding radio frequency channel is a difference between a distance that is from a to-be-calibrated antenna corresponding to the corresponding radio frequency channel to the calibration antenna and a distance that is from a to-be-calibrated antenna corresponding to the reference radio frequency channel to the calibration antenna. In the foregoing technical solution, a radio frequency module of multiple radio frequency modules of the wireless device calibrates a radio frequency channel corresponding to another radio frequency module, and the calibration may not be limited to being performed before delivery. When performing no calibration, the wireless device may perform normal communication using the multiple radio frequency modules, and complexity of the wireless device is not increased. When radio frequency channel calibration is performed, impact imposed by an antenna difference and an antenna distance difference on a phase is considered such that calibration accuracy is improved.

In a possible implementation, the processor is further configured to switch a channel on which the first radio frequency module operates and/or a channel on which the second radio frequency module operates, where the frequency band on which the first radio frequency module and the second radio frequency module operate includes multiple channels. When a radio frequency channel operates on different channels of a same frequency band, a phase varies slightly. Although it is feasible to calibrate a radio frequency channel that operates on another channel using data obtained by means of calibration when a radio frequency channel operates on a single channel, calibration accuracy can be further improved by separately calibrating a radio frequency channel on multiple different channels.

In a possible implementation, the processor is a baseband chip or a central processing unit. In the foregoing optional technical solutions, the wireless device implements radio frequency channel phase calibration using the baseband chip or the central processing unit.

In a possible implementation, the wireless device includes multiple second radio frequency modules. Each of the multiple second radio frequency modules may be configured to receive the calibration signal sent by the first radio frequency module. Calibrating multiple radio frequency modules at a time can improve efficiency of radio frequency channel calibration.

According to a second aspect, a radio frequency channel calibration method is provided, and the method includes sending, by a first radio frequency module of a wireless device, a calibration signal using a calibration antenna, receiving, by a second radio frequency module of the wireless device, the calibration signal using at least two to-be-calibrated antennas, where the second radio frequency module corresponds to at least two radio frequency channels, the at least two radio frequency channels respectively correspond to the at least two to-be-calibrated antennas, the calibration antenna and the at least two to-be-calibrated antennas are located in the wireless device, and a quantity of the at least two radio frequency channels is the same as a quantity of the at least two to-be-calibrated antennas, and determining, by the wireless device, a device phase difference of each of the at least two radio frequency channels, where the device phase difference is a difference between a receive phase difference and a distance phase difference that are of a corresponding radio frequency channel, the receive phase difference of the corresponding radio frequency channel is a phase difference between the calibration signal received on the corresponding radio frequency channel and the calibration signal received on a reference radio frequency channel, the distance phase difference of the corresponding radio frequency channel is based on a distance difference of the corresponding radio frequency channel and a channel phase difference of the calibration signal, and the distance difference of the corresponding radio frequency channel is a difference between a distance that is from a to-be-calibrated antenna corresponding to the corresponding radio frequency channel to the calibration antenna and a distance that is from a to-be-calibrated antenna corresponding to the reference radio frequency channel to the calibration antenna.

In a possible implementation, the method further includes switching, by the wireless device, channels of the first radio frequency module and/or the second radio frequency module, where a frequency band on which the first radio frequency module and the second radio frequency module operate includes multiple channels.

In a possible implementation, the wireless device includes multiple second radio frequency modules, and after sending, by a first radio frequency module of a wireless device, a calibration signal using a calibration antenna, the method further includes receiving, by each of the multiple second radio frequency modules, the calibration signal using the at least two to-be-calibrated antennas, where each radio frequency module corresponds to at least two radio frequency channels, determining, by the wireless device, the device phase difference of each of the at least two radio frequency channels corresponding to each radio frequency module, and calibrating, by the wireless device, the corresponding radio frequency channel using the device phase difference of each of the at least two radio frequency channels corresponding to each radio frequency module. In the foregoing optional technical solutions, each of the multiple second radio frequency modules included in the wireless device may receive the calibration signal sent by the first radio frequency module such that calibrating multiple radio frequency modules at a time can improve efficiency of radio frequency channel calibration.

In a possible implementation, the device may further calibrate radio frequency channels on all channels after switching the channel on which the first radio frequency module operates and/or the channel on which the second radio frequency module operates such that device phase differences of all radio frequency channels on different channels may be stored. For example, the device phase differences are stored in a correspondence among a channel, a radio frequency channel, and a device phase difference, and the correspondence may be used to perform radio frequency channel phase calibration. For example, when the device is located on a channel, the device may directly query the correspondence among the channel, the radio frequency channel, and the device phase difference to perform channel calibration such that channel calibration time can be reduced.

In a possible implementation, the device may further update the stored correspondence among the channel, the radio frequency channel, and the device phase difference at intervals of a preset period in order to ensure real-time performance and accuracy of channel calibration.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Technical terms used in this application are described first before the present disclosure is described.

Radio frequency module: also referred to as a radio frequency circuit, which may be configured to connect one or more antennas. Optionally, the radio frequency module includes but is not limited to a filter, a low noise amplifier (LNA), an analog-to-digital/digital-to-analog (A/D or D/A) converter, and the like.

Frequency band and channel: both used to indicate a spectrum resource. One frequency band usually includes multiple channels. For example, a 2.4 gigahertz (GHz) frequency band may include 14 channels.

Radio frequency channel: a channel on which signal receiving and sending are performed and that includes an antenna and a radio frequency module. In addition, one antenna corresponds to one radio frequency channel in a signal receiving and sending process.

Figure 1:
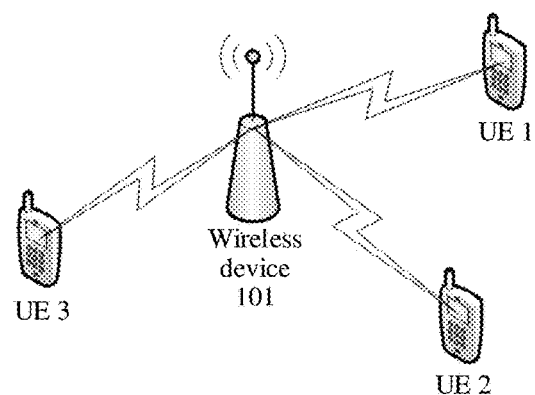
FIG. 1 is a schematic structural diagram of a communications system according to an embodiment of the present disclosure.

FIG. 1 shows a schematic structural diagram of a communications system applied to an embodiment of the present disclosure. The communications system includes a wireless device 101 and user equipment (UE) 102. There may be one or more user equipments 102, such as UE 1, UE 2, and UE 3 shown in FIG. 1.

The wireless device 101 may be a wireless access point (AP) in a wireless local area network. In this embodiment of the present disclosure, the wireless device 101 may include multiple radio frequency modules (not shown), and each radio frequency module may be connected to one or more antennas (not shown).

Figure 2:
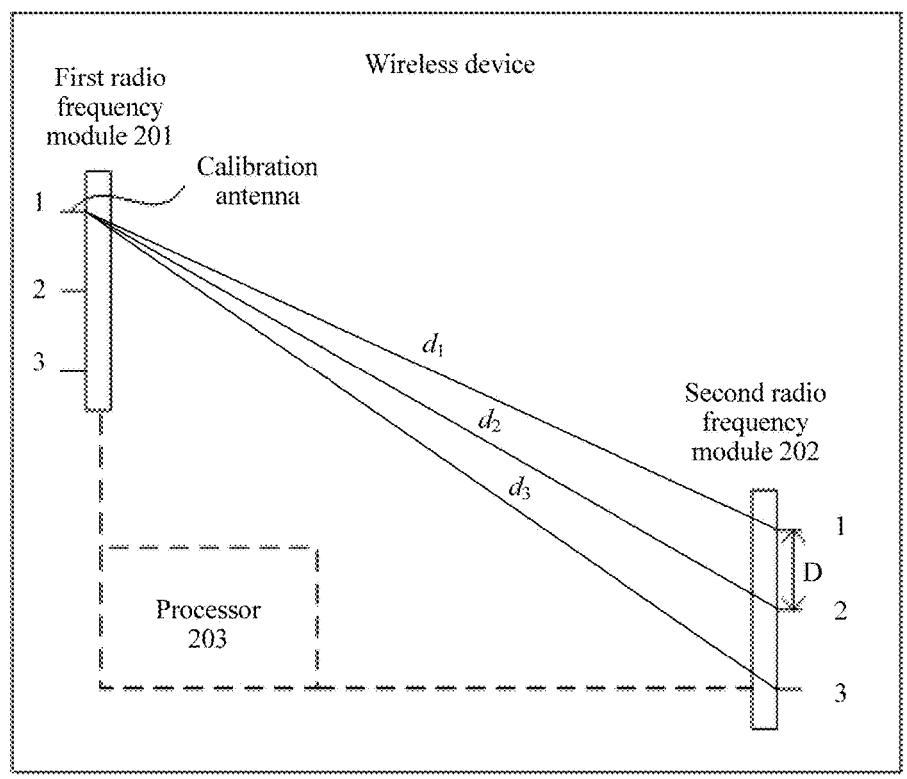
FIG. 2 is a schematic structural diagram of a wireless device according to an embodiment of the present disclosure.

FIG. 2 is a schematic structural diagram of a wireless device according to an embodiment of the present disclosure. As shown in FIG. 2, the wireless device includes a first radio frequency module 201, a second radio frequency module 202, and a processor 203. The first radio frequency module 201 and the second radio frequency module 202 operate on a same frequency band. The second radio frequency module 202 corresponds to at least two radio frequency channels, the at least two radio frequency channels respectively correspond to at least two to-be-calibrated antennas (designated as 1, 2, and 3), and a quantity of the at least two radio frequency channels is the same as a quantity of the at least two to-be-calibrated antennas.

A same quantity of at least two radio frequency channels corresponding to a single radio frequency module and at least two to-be-calibrated antennas indicates a correspondence between at least two radio frequency channels and at least two to-be-calibrated antennas. The correspondence may be a one-to-one correspondence, that is, one radio frequency channel corresponds to one to-be-calibrated antenna, and one to-be-calibrated antenna corresponds to one radio frequency channel.

Figure 3:
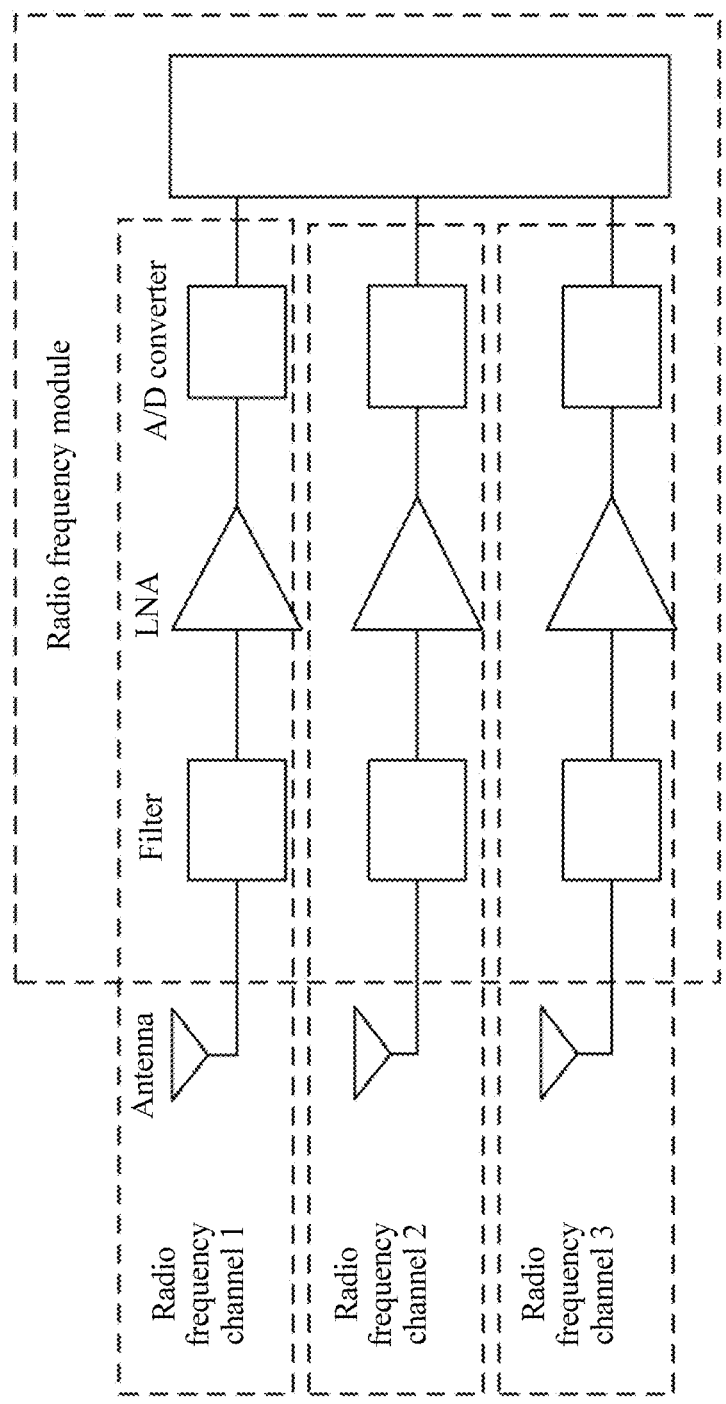
FIG. 3 is a schematic diagram of a radio frequency channel corresponding to a radio frequency module according to an embodiment of the present disclosure.

As shown in FIG. 3, FIG. 3 is a schematic structural diagram of a radio frequency module. The radio frequency module shown in FIG. 3 corresponds to three radio frequency channels. The radio frequency module may be the first radio frequency module 201 or the second radio frequency module 202 in FIG. 2. The second radio frequency module 202 is used as an example. The three radio frequency channels are in a one-to-one correspondence with three to-be-calibrated antennas connected to the second radio frequency module 202. For example, each radio frequency channel (designated as radio frequency channel 1, radio frequency channel 2, and radio frequency channel 3) in FIG. 3 may include an antenna, a filter, an LNA, an A/D converter, and the like corresponding to the radio frequency channel.

The first radio frequency module 201 is connected to a calibration antenna (i.e., antenna designated as 1 in antennas 1, 2, and 3), and configured to send a calibration signal using the calibration antenna. The second radio frequency module 202 receives the calibration signal using the at least two to-be-calibrated antennas.

The first radio frequency module 201 may be connected to one or more antennas. When the first radio frequency module 201 is connected to one antenna, the antenna may be used as a calibration antenna, the first radio frequency module 201 may send a calibration signal using the antenna, and the calibration signal may be sent through a channel on which the first radio frequency module 201 operates. When the first radio frequency module 201 is connected to multiple antennas, any one of the multiple antennas may be used as a calibration antenna, and the first radio frequency module 201 is configured to be in a one-antenna transmission mode, and sends a calibration signal using only the calibration antenna. When the first radio frequency module 201 transmits the calibration signal using the calibration antenna, the second radio frequency module 202 receives the calibration signal using the multiple antennas. For example, the second radio frequency module 202 is configured to be in an all-antenna reception mode. In the all-antenna reception mode, the second radio frequency module 202 receives the calibration signal using all antennas connected to the second radio frequency module 202.

The processor 203 is configured to determine a device phase difference of each of the at least two radio frequency channels, and calibrate a corresponding radio frequency channel using the device phase difference of each of the at least two radio frequency channels. The device phase difference is a difference between a receive phase difference and a distance phase difference that are of the corresponding radio frequency channel, the receive phase difference of the corresponding radio frequency channel is a phase difference between a calibration signal received on the corresponding radio frequency channel and a calibration signal received on a reference radio frequency channel, the distance phase difference of the corresponding radio frequency channel is based on a distance difference of the corresponding radio frequency channel and a channel phase difference of the calibration signal, and the distance difference of the corresponding radio frequency channel is a difference between a distance that is from a to-be-calibrated antenna connected to the corresponding radio frequency channel to the calibration antenna and a distance that is from a to-be-calibrated antenna connected to the reference radio frequency channel to the calibration antenna.

The processor 203 may be a baseband chip or a central processing unit. When the processor 203 is the baseband chip, the baseband chip may be directly integrated into a radio frequency module. For example, the baseband chip is integrated into the second radio frequency module 202 such that the second radio frequency module 202 determines the device phase difference of each of the at least two radio frequency channels, and calibrates the corresponding radio frequency channel using the device phase difference of each of the at least two radio frequency channels.

The foregoing wireless device may include multiple radio frequency modules 201 and 202, and the multiple radio frequency modules 201 and 202 may be configured to perform data receiving and sending or configured to perform radio frequency channel calibration, instead of being exclusively configured to perform radio frequency channel calibration. When radio frequency channel calibration is performed, the first radio frequency module 201 may be referred to as an auxiliary calibration radio frequency module, and the second radio frequency module 202 may be referred to as a to-be-calibrated radio frequency module. The radio frequency modules 201 and 202 are classified into the auxiliary calibration radio frequency module and the to-be-calibrated radio frequency module based on functions when the radio frequency channel calibration is performed. In practical application, any radio frequency module included in the wireless device has different functions in different calibration processes. For example, in a calibration process, the first radio frequency module 201 may be used as the auxiliary calibration radio frequency module, and the second radio frequency module 202 may be used as the to-be-calibrated radio frequency module. In another calibration process, the first radio frequency module 201 may be used as the to-be-calibrated radio frequency module, and the second radio frequency module 202 may be used as the auxiliary calibration radio frequency module.

The processor 203 is further configured to switch a channel on which the first radio frequency module 201 operates and/or a channel on which the second radio frequency module 202 operates, where the frequency band on which the first radio frequency module 201 and the second radio frequency module 202 operate includes multiple channels.

Further, the processor 203 may switch a channel of either of the first radio frequency module 201 and the second radio frequency module 202, or may simultaneously switch channels on which the first radio frequency module 201 and the second radio frequency module 202 operate, and may switch the channels on which the first radio frequency module 201 and the second radio frequency module 202 operate to a same channel or different channels. When a radio frequency channel operates on different channels of a same frequency band, a phase has a delicate difference. Although it is feasible to calibrate a radio frequency channel that operates on another channel using data obtained by means of calibration when a radio frequency channel operates on a single channel, calibration accuracy can be further improved by separately calibrating a radio frequency channel on multiple different channels.

In addition, the second radio frequency module 202 may include multiple radio frequency modules. The multiple radio frequency modules and the first radio frequency module 201 operate on a same frequency band. When radio frequency channel calibration is performed on the second radio frequency module 202, the multiple radio frequency modules may be simultaneously calibrated such that calibrating multiple radio frequency modules at a time can improve efficiency of radio frequency channel calibration.

Optionally, to improve accuracy of radio frequency channel calibration and reduce signal interference between antennas, the calibration antenna connected to the first radio frequency module 201 and the at least two to-be-calibrated antennas connected to the second radio frequency module 202 may not be in a same straight line. For example, as shown in FIG. 2, the calibration antenna connected to the first radio frequency module 201 and the three to-be-calibrated antennas connected to the second radio frequency module 202 are not in a same straight line, and distances between the calibration antenna and the three to-be-calibrated antennas are respectively $d_1$, $d_2$, and $d_3$.

Optionally, to improve a power of receiving a calibration signal by each of the at least two to-be-calibrated antennas connected to the second radio frequency module 202, a polarization direction of the calibration antenna connected to the first radio frequency module 201 may be the same as polarization directions of the at least two to-be-calibrated antennas connected to the second radio frequency module 202.

Further, when the wireless device calibrates a radio frequency channel in a frequency band, according to a wavelength corresponding to a center frequency of the channel on which the second radio frequency module 202 operates, a distance D between the at least two to-be-calibrated antennas connected to the second radio frequency module 202 may be greater than or equal to a half of the wavelength. Preferably, the distance D between the at least two to-be-calibrated antennas is equal to a half of the wavelength.

In the wireless device provided in this embodiment of the present disclosure, the radio frequency module 201 of multiple radio frequency modules 201 and 202 of the wireless device calibrates a radio frequency channel corresponding to the radio frequency module 202, and the calibration may not be limited to being performed before delivery. When performing no calibration, the wireless device may perform normal communication using the multiple radio frequency modules 201 and 202, and complexity of the wireless device is not increased. When radio frequency channel calibration is performed, impact imposed by an antenna difference and an antenna distance difference on a phase is considered such that calibration accuracy is improved.

Figure 4:
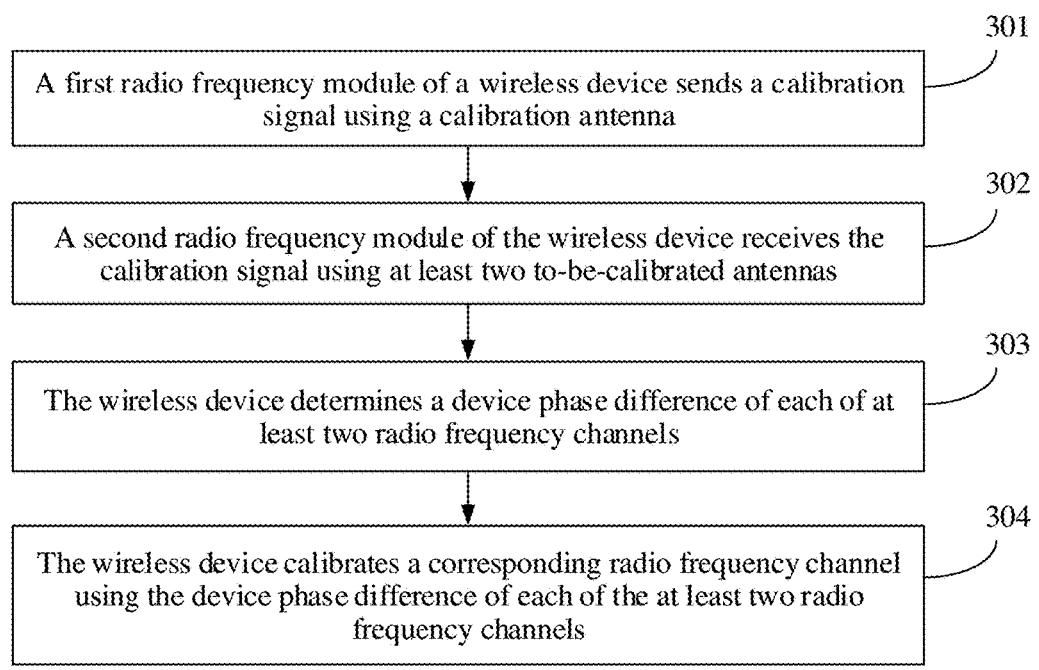
FIG. 4 is a schematic flowchart of a radio frequency channel calibration method according to an embodiment of the present disclosure.

FIG. 4 is a flowchart of a radio frequency channel calibration method according to an embodiment of the present disclosure. The method is applied to a wireless device. Referring to FIG. 4, the method includes the following steps.

Step 301: A first radio frequency module of a wireless device sends a calibration signal using a calibration antenna.

Step 302: A second radio frequency module of the wireless device receives the calibration signal using at least two to-be-calibrated antennas. The second radio frequency module corresponds to at least two radio frequency channels, the at least two radio frequency channels respectively correspond to the at least two to-be-calibrated antennas, the calibration antenna and the at least two to-be-calibrated antennas are located in the wireless device, and a quantity of the at least two radio frequency channels is the same as a quantity of the at least two to-be-calibrated antennas.

Step 303: The wireless device determines a device phase difference of each of the at least two radio frequency channels. The device phase difference is a difference between a receive phase difference and a distance phase difference that are of a corresponding radio frequency channel, the receive phase difference of the corresponding radio frequency channel is a phase difference between a calibration signal received on the corresponding radio frequency channel and a calibration signal received on a reference radio frequency channel, the distance phase difference of the corresponding radio frequency channel is based on a distance difference of the corresponding radio frequency channel and a channel phase difference of the calibration signal, and the distance difference of the corresponding radio frequency channel is a difference between a distance that is from a to-be-calibrated antenna corresponding to the corresponding radio frequency channel to the calibration antenna and a distance that is from a to-be-calibrated antenna corresponding to the reference radio frequency channel to the calibration antenna.

Further, the distance phase difference of the corresponding radio frequency channel may be determined using the following method determining, for an $i^{th}$ antenna of the at least two to-be-calibrated antennas according to a distance between the calibration antenna and an $(i-1)^{th}$ antenna of the at least two to-be-calibrated antennas and a distance between the calibration antenna and the $i^{th}$ antenna, a transmit distance difference between the $i^{th}$ antenna and the $(i-1)^{th}$ antenna, where $i \geq 2$, and determining, according to a center frequency and the transmit distance difference, a distance phase difference of a radio frequency channel corresponding to the $i^{th}$ antenna in order to obtain a distance phase difference of each of the at least two radio frequency channels corresponding to the at least two to-be-calibrated antennas.

For the radio frequency channel corresponding to the $i^{th}$ antenna of the at least two to-be-calibrated antennas, the distance phase difference of the radio frequency channel corresponding to the $i^{th}$ antenna is determined according to the center frequency f, the distance $d_i$ between the calibration antenna and the $(i-1)^{th}$ antenna, and the distance $d_{i-1}$ between the calibration antenna and the $i^{th}$ antenna and using a formula (1). In the formula, c is a speed of light, and $\lambda$ is a wavelength.

$$\varphi_{i-(i-1)} = 2\pi(d_i - d_{i-1})*f/c = 2\pi(d_i - d_{i-1})/\lambda \quad (1)$$

Therefore, when a quantity of the at least two to-be-calibrated antennas is A, determined distance phase differences of the at least two radio frequency channels may be expressed as $\{\varphi_{2-1}, \varphi_{3-2}, \ldots, \varphi_{A-(A-1)}\}$.

For example, as shown in FIG. 2, the at least two to-be-calibrated antennas include three antennas, and distances between the three antennas and an auxiliary calibration antenna are $d_1$ of 7 centimeters (cm), $d_2$ of 8.7 cm, and $d_3$ of 11 cm. If a wavelength corresponding to the center frequency is 5.5 cm, the distance phase differences of the at least two radio frequency channels determined according to the foregoing formula (1) are $\{1.9, 2.4\}$, or may be denoted as $\{109°, 138°\}$.

Because a location of each antenna of the wireless device is fixed, a distance between antennas is also fixed. The distance between antennas may be obtained in design or production. Therefore, the wireless device pre-stores the distance between antennas, and calculates, during calibration and according to the distance between antennas and a frequency (or a wavelength) of a channel on which a radio frequency module operates, a distance phase difference caused due to a distance difference between different antenna pairs. Alternatively, the wireless device pre-stores the distance phase difference obtained by means of calculation according to the distance between antennas and a frequency (or a wavelength) of each channel. When performing radio frequency channel calibration, the wireless device may directly obtain the distance phase difference of the corresponding radio frequency channel according to the channel on which the radio frequency module operates.

Further, the receive phase difference of the corresponding radio frequency channel may be determined using the following method determining, for the $i^{th}$ antenna of the at least two antennas according to a calibration signal received by the $(i-1)^{th}$ antenna and a calibration signal received by the $i^{th}$ antenna, a receive phase difference of a radio frequency channel corresponding to the $i^{th}$ antenna. The receive phase difference of the radio frequency channel corresponding to the $i^{th}$ antenna may be a difference between a phase of the calibration signal received by the $i^{th}$ antenna and a phase of the calibration signal received by the $(i-1)^{th}$ antenna. The difference may be a phase difference determined according to one received calibration signal, or may be an average of phase differences determined according to multiple received calibration signals such that a receive phase difference of each of the at least two radio frequency channels corresponding to the at least two to-be-calibrated antennas is obtained.

For example, as shown in FIG. 3, if calibration signals received by three antennas included in the at least two to-be-calibrated antennas are respectively CS1, CS2, and CS3, it is determined that the receive phase differences of the at least two radio frequency channels are $\{\varphi_{CS_2-CS_1}, \varphi_{CS_3-CS_2}\}$.

Further, when the wireless device determines the device phase difference of each of the at least two radio frequency channels, for the $i^{th}$ antenna of the at least two to-be-calibrated antennas, the wireless device subtracts the corresponding distance phase difference from the receive phase difference of the radio frequency channel corresponding to the $i^{th}$ antenna to obtain the device phase difference of the radio frequency channel corresponding to the $i^{th}$ antenna such that the device phase difference of each of the at least two radio frequency channels may be obtained.

The wireless device performs phase calibration using a signal received by a first antenna as a reference. Therefore, a calibration phase corresponding to the first antenna is zero. Alternatively, any one of the at least two antennas may be used as a reference for phase calibration.

Step 304: The wireless device calibrates the corresponding radio frequency channel using the device phase difference of each of the at least two radio frequency channels.

Further, when the wireless device determines the device phase difference of each of the at least two radio frequency channels, the wireless device may perform phase calibration on each of the at least two radio frequency channels according to the device phase difference.

The method further includes switching, by the wireless device, a channel on which the first radio frequency module operates and/or a channel on which the second radio frequency module operates, and calibrating radio frequency channels on different channels according to the radio frequency channel calibration method in the foregoing step 301 to step 304.

When the wireless device calibrates the radio frequency channels on the different channels according to the foregoing method and obtains device phase differences of all radio frequency channels on the different channels, the wireless device may store the device phase differences of all the radio frequency channels on the different channels, for example, store the device phase differences in a correspondence among a channel, a radio frequency channel, and a device phase difference shown in the following Table 1. When the wireless device subsequently needs to perform radio frequency channel calibration again, the wireless device may not be required to determine a corresponding device phase difference of each radio frequency channel according to the foregoing step 301 to step 303, and instead, may directly obtain the corresponding device phase difference of each radio frequency channel from the stored correspondence according to a channel and a radio frequency channel that need to be calibrated, and calibrate each radio frequency channel based on the obtained device phase difference of each radio frequency channel such that a speed of radio frequency channel calibration can be improved.

TABLE 1

| Device phase difference | Radio frequency channel 1 | Radio frequency channel 2 | ... |
| --- | --- | --- | --- |
| Channel 1 | a1 | a2 | ... |
| Channel 2 | b1 | b2 | ... |
| ... | ... | ... | ... |

The correspondence among the channel, the radio frequency channel, and the device phase difference shown in the foregoing Table 1 is only an example, and Table 1 does not constitute a limitation on this embodiment of the present disclosure.

Further, when obtaining the corresponding device phase difference of each radio frequency channel according to the correspondence among a channel, a radio frequency channel, and a device phase difference and performing radio frequency channel calibration, the wireless device may further periodically update the correspondence among the channel, the radio frequency channel, and the device phase difference to ensure real-time performance and accuracy of channel calibration. That is, the wireless device re-determines a correspondence between device phase differences corresponding to all radio frequency channels according to the foregoing steps 301 to 304 for use in subsequent radio frequency channel calibration.

For example, an update period may be one week or 24 hours.

According to the radio frequency channel calibration method provided in this embodiment of the present disclosure, a calibration signal is sent using a calibration antenna connected to a first radio frequency module, the calibration signal is received using at least two to-be-calibrated antennas connected to a second radio frequency module, and a device phase difference of each radio frequency channel is determined. Radio frequency channel calibration is implemented based on the device phase difference of each radio frequency channel such that a radio frequency module of multiple radio frequency modules of a wireless device calibrates a radio frequency channel of another radio frequency module, and the calibration may not be limited to being performed before delivery. In addition, when performing no calibration, the wireless device may perform normal communication using the multiple radio frequency modules, and complexity of the wireless device is not increased. In addition, when the radio frequency channel is performed, impact imposed by an antenna difference and an antenna distance difference on a phase is considered such that calibration accuracy is improved.

Finally, it should be noted that the foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless device, comprising:
   a first radio frequency circuit;
   a second radio frequency circuit; and
   a processor coupled to the first radio frequency circuit and the second radio frequency circuit,
   wherein the first radio frequency circuit and the second radio frequency circuit operate on a same frequency band,
   wherein the first radio frequency circuit is coupled to a calibration antenna and configured to send a calibration signal using the calibration antenna,
   wherein the second radio frequency circuit is coupled to at least two to-be-calibrated antennas and configured to receive the calibration signal using each of the at least two to-be-calibrated antennas,
   wherein the second radio frequency circuit corresponds to at least two radio frequency channels,
   wherein the at least two radio frequency channels respectively correspond to the at least two to-be-calibrated antennas,
   wherein a quantity of the at least two radio frequency channels is the same as a quantity of the at least two to-be-calibrated antennas, and
   wherein the processor is configured to:
      calibrate a corresponding radio frequency channel using a device phase difference of each of the at least two radio frequency channels,
   wherein the device phase difference is a difference between a receive phase difference and a distance phase difference of the corresponding radio frequency channel,
   wherein the receive phase difference of the corresponding radio frequency channel is a phase difference between the calibration signal received on the corresponding radio frequency channel and the calibration signal received on a reference radio frequency channel,
   wherein the distance phase difference of the corresponding radio frequency channel is based on a distance difference of the corresponding radio frequency channel and a channel phase difference of the calibration signal, and
   wherein the distance difference of the corresponding radio frequency channel is a difference between a distance from a to-be-calibrated antenna corresponding to the corresponding radio frequency channel to the calibration antenna and a distance from a to-be-calibrated antenna corresponding to the reference radio frequency channel to the calibration antenna.

2. The wireless device according to claim 1, wherein the processor is further configured to switch a channel on which the first radio frequency circuit operates and a channel on which the second radio frequency circuit operates, and wherein the frequency band on which the first radio frequency circuit and the second radio frequency circuit operate comprises a plurality of channels.

3. The wireless device according to claim 1, wherein the processor is further configured to switch a channel on which the first radio frequency circuit operates, and wherein the frequency band on which the first radio frequency circuit and the second radio frequency circuit operate comprises a plurality of channels.

4. The wireless device according to claim 1, wherein the processor is further configured to switch a channel on which the second radio frequency circuit operates, and wherein the frequency band on which the first radio frequency circuit and the second radio frequency circuit operate comprises a plurality of channels.

5. The wireless device according to claim 1, wherein the processor is a baseband chip.

6. The wireless device according to claim 1, wherein the processor is a central processing unit.

7. The wireless device according to claim 1, further comprising a plurality of second radio frequency circuits coupled to the first radio frequency circuit and the processor.

8. A radio frequency channel calibration method, comprising:
   sending, by a first radio frequency circuit of a wireless device, a calibration signal using a calibration antenna;
   receiving, by a second radio frequency circuit of the wireless device, the calibration signal using at least two to-be-calibrated antennas, wherein the second radio frequency circuit corresponds to at least two radio frequency channels, wherein the at least two radio frequency channels respectively correspond to the at least two to-be-calibrated antennas, wherein the calibration antenna and the at least two to-be-calibrated antennas are located in the wireless device, and wherein a quantity of the at least two radio frequency channels is the same as a quantity of the at least two to-be-calibrated antennas;
   determining, by the wireless device, a device phase difference of each of the at least two radio frequency channels, wherein the device phase difference is a difference between a receive phase difference and a distance phase difference of a corresponding radio frequency channel, wherein the receive phase difference of the corresponding radio frequency channel is a phase difference between the calibration signal received on the corresponding radio frequency channel and the calibration signal received on a reference radio frequency channel, wherein the distance phase difference of the corresponding radio frequency channel is based on a distance difference of the corresponding radio frequency channel and a channel phase difference of the calibration signal, and wherein the distance difference of the corresponding radio frequency channel is a difference between a distance from a to-be-calibrated antenna corresponding to the corresponding radio frequency channel to the calibration antenna and a distance from a to-be-calibrated antenna corresponding to the reference radio frequency channel to the calibration antenna; and
   calibrating, by the wireless device, the corresponding radio frequency channel using the device phase difference of each of the at least two radio frequency channels.

9. The method according to claim 8, further comprising switching, by the wireless device, channels of the first radio frequency circuit and the second radio frequency circuit, wherein a frequency band on which the first radio frequency circuit and the second radio frequency circuit operate comprises a plurality of channels.

10. The method according to claim 8, further comprising switching, by the wireless device, channels of the first radio frequency circuit, wherein a frequency band on which the first radio frequency circuit and the second radio frequency circuit operate comprises a plurality of channels.

11. The method according to claim 8, further comprising switching, by the wireless device, channels of the second radio frequency circuit, wherein a frequency band on which the first radio frequency circuit and the second radio frequency circuit operate comprises a plurality of channels.

12. The method according to claim 8, wherein the wireless device comprises a plurality of second radio frequency circuits, and wherein after sending the calibration signal using the calibration antenna, the method further comprises:
  receiving, by each of the plurality of second radio frequency circuits, the calibration signal using the at least two to-be-calibrated antennas, wherein each radio frequency circuit corresponds to at least two radio frequency channels;
  determining, by the wireless device, the device phase difference of each of the at least two radio frequency channels corresponding to each radio frequency circuit; and
  calibrating, by the wireless device, the corresponding radio frequency channel using the device phase difference of each of the at least two radio frequency channels corresponding to each radio frequency circuit.

13. A computer program product comprising a non-transitory computer readable storage medium storing program code thereon for radio frequency channel calibration, the program code comprising instructions for executing a method that comprises:
  sending, by a first radio frequency circuit of a wireless device, a calibration signal using a calibration antenna;
  receiving, by a second radio frequency circuit of the wireless device, the calibration signal using at least two to-be-calibrated antennas, wherein the second radio frequency circuit corresponds to at least two radio frequency channels, wherein the at least two radio frequency channels respectively correspond to the at least two to-be-calibrated antennas, wherein the calibration antenna and the at least two to-be-calibrated antennas are located in the wireless device, and wherein a quantity of the at least two radio frequency channels is the same as a quantity of the at least two to-be-calibrated antennas;
  determining, by the wireless device, a device phase difference of each of the at least two radio frequency channels, wherein the device phase difference is a difference between a receive phase difference and a distance phase difference of a corresponding radio frequency channel, wherein the receive phase difference of the corresponding radio frequency channel is a phase difference between the calibration signal received on the corresponding radio frequency channel and the calibration signal received on a reference radio frequency channel, wherein the distance phase difference of the corresponding radio frequency channel is based on a distance difference of the corresponding radio frequency channel and a channel phase difference of the calibration signal, and wherein the distance difference of the corresponding radio frequency channel is a difference between a distance from a to-be-calibrated antenna corresponding to the corresponding radio frequency channel to the calibration antenna and a distance from a to-be-calibrated antenna corresponding to the reference radio frequency channel to the calibration antenna; and
  calibrating, by the wireless device, the corresponding radio frequency channel using the device phase difference of each of the at least two radio frequency channels.

14. The computer program product according to claim 13, further comprising switching, by the wireless device, channels of the first radio frequency circuit and the second radio frequency circuit, wherein a frequency band on which the first radio frequency circuit and the second radio frequency circuit operate comprises a plurality of channels.

15. The computer program product according to claim 13, further comprising switching, by the wireless device, channels of the first radio frequency circuit, wherein a frequency band on which the first radio frequency circuit and the second radio frequency circuit operate comprises a plurality of channels.

16. The computer program product according to claim 13, further comprising switching, by the wireless device, channels of the second radio frequency circuit, wherein a frequency band on which the first radio frequency circuit and the second radio frequency circuit operate comprises a plurality of channels.

17. The computer program product according to claim 13, wherein the wireless device comprises a plurality of second radio frequency circuits, and wherein after sending the calibration signal using the calibration antenna, the method further comprises:
  receiving, by each of the plurality of second radio frequency circuits, the calibration signal using the at least two to-be-calibrated antennas, wherein each radio frequency circuit corresponds to at least two radio frequency channels;
  determining, by the wireless device, the device phase difference of each of the at least two radio frequency channels corresponding to each radio frequency circuit; and
  calibrating, by the wireless device, the corresponding radio frequency channel using the device phase difference of each of the at least two radio frequency channels corresponding to each radio frequency circuit.

* * * * *

UNITED STATES PATENT AND TRADEMARK OFFICE
CERTIFICATE OF CORRECTION

PATENT NO. : 9,992,776 B2  
APPLICATION NO. : 15/784940  
DATED : June 5, 2018  
INVENTOR(S) : Wei Ruan et al.

It is certified that error appears in the above-identified patent and that said Letters Patent is hereby corrected as shown below:

On the Title Page

Under Notice should read:
Subject to any disclaimer, the term of this patent is extended or adjusted under 35 U.S.C. 154(b) by 0 days.

Signed and Sealed this
Tenth Day of July, 2018

Andrei Iancu
*Director of the United States Patent and Trademark Office*